United States Patent

Sumikama

[15] 3,693,447
[45] Sept. 26, 1972

[54] RADIANT HEAT FLOW METER

[72] Inventor: Sadao Sumikama, Yokohama, Japan
[73] Assignee: Showa Denko K.K., Tokyo, Japan
[22] Filed: Dec. 29, 1970
[21] Appl. No.: 102,385

[52] U.S. Cl..................................73/341, 73/DIG. 7
[51] Int. Cl..........................G01k 7/02, G01k 17/00
[58] Field of Search................73/190 H, DIG. 7, 341

[56] References Cited

UNITED STATES PATENTS

| | | | |
|---|---|---|---|
| 3,131,304 | 4/1964 | Hager | 73/190 H |
| 1,528,383 | 3/1925 | Schmidt | 73/341 |

*Primary Examiner*—Louis R. Prince
*Assistant Examiner*—Frederick Shoon
*Attorney*—Kemon, Palmer & Estabrook

[57] ABSTRACT

A radiant heat flow meter is constructed of thermally resistant plates disposed on two faces of a thin plate of good heat conductivity. One or more pairs of differential thermocouples are disposed on the surfaces of the thermally resistant plates and connected with each other. Black thermally resistant plates are arranged in contact with the thermocouples and thin transparent plates overly the black plates so as to form air layers therebetween.

3 Claims, 6 Drawing Figures

INVENTOR.
Sadao Sumikama

INVENTOR.
Sadao Sumikama

RADIANT HEAT FLOW METER

This invention relates to a radiant heat flow meter capable of measuring with high accuracy the mutual transmission and reception of radiant heat between the surfaces of various bodies.

In a variety of chemical, mechanical, or building apparatus used at relatively high temperatures, such as electric furnaces, or electrolytic cells, it is of extreme importance in design and operation to accurately grasp the mutual transmission and reception of radiation energy between the surfaces of various bodies having different temperatures.

Indeed, it was convenient for the conventional radiant heat flow meter to simply measure incident radiant heat or radiant heat transmitted from a given surface. As described above, however, it was inconvenient to measure with high accuracy the mutual transmission and reception of radiant heat between the surfaces of various bodies having different temperatures.

Accordingly, an object of the invention is to surmount this disadvantage and provide an improved radiant heat flow meter capable of measuring with high accuracy the mutual transmission and reception of radiant heat between the surfaces of various bodies. This meter comprises a thin plate of good thermal conductivity, thermally resistant plates disposed on two faces of the thin plate, at least one pair of mutually connected temperature measuring bodies disposed on the surfaces of the thermally resistant plates, black thermally resistant plates disposed in contact with said temperature measuring bodies, and transparent thin plates for coating said black plates so as to form air layers on the outside of said black plates.

Since the radiant heat flow meter of the invention has excellent characteristics in comparison with those of the prior art, it can contribute very much in chemical, mechanical, building, and many other fields.

This invention can be more fully understood from the following detailed description when taken in connection with reference to the accompanying drawings, in which.

Figure 1:
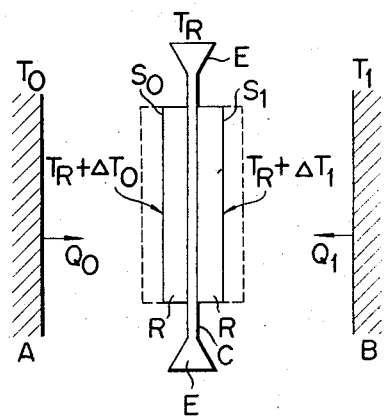
FIG. 1 is an explanatory diagram illustrating the basic principle of the invention.

Referring now particularly to FIG. 1, a detailed description will be given of the basic principle involved, thereby affording a better understanding of the radiant heat flow meter of the invention.

Assume that a plate C having an approximately 100 percent reflection factor, a high thermal conductivity, and emissive portions E, E at both ends is interposed between the two mutually opposing surfaces having $T_0$ and $T_1$ as absolute temperatures (°K). Assume also that thermally resistant thin plates R each with a black surface are disposed on both sides of the plate C, as shown in FIG. 1. Then, the temperature of the plate C is substantially equal to room (air) temperature $T_R$. Radiant heat emitted from the surfaces A and B respectively enters the black surfaces $S_0$ and $S_1$ of the plate R, passes as transmitted heat, through the plates R and C and is emitted by convection heat transfer from the emissive portions E, E into the surrounding atmosphere.

Therefore, the temperatures of the black surfaces $S_0$ and $S_1$ are increased by $\Delta T_0$ and $\Delta T_1$ as compared with room temperature $T_R$ corresponding to the heat flow at this particular instant. It can be considered, however, that if the thickness of each thermally resistant plate is sufficiently small, then the temperature increments $\Delta T_0$, $\Delta T_1$ are negligibly small in comparison with the temperatures $T_0$, $T_1$, $T_R$.

If $Q_0$ denotes the radiant heat emitted from unit area of the surface A to that of the plate C and $Q_1$ denotes the radiant heat emitted from unit area of the surface B to that of the plate C and if $E_0$ and $E_1$ denote the emissivities from the surfaces A and B respectively, then $Q_0$ and $Q_1$ are given by $$Q_0 = E_0 \delta \{T_0^4 - (T_R + \Delta T_0)^4\}$$
$$\doteq E_0 \delta \Delta \{T_0^4 - T_R^4\} = K_0 T_0 \qquad (1)$$
$$Q_1 = E_1 \delta \{T_1^4 - (T_R + \Delta T_1)^4\}$$
$$\doteq E_1 \delta \{T_1^4 - T_R^4\} = K_1 \Delta T_1 \qquad (2)$$

where $\delta$ designates the Stefan-Boltzmann constant, and $K_0$ and $K_1$ denote the radiation coefficient. If both the thermal resistant plates R have the same thickness and material, then $K_0 = K_1 = K$.

Therefore, $$Q_1 - Q_0 \doteq K(\Delta T_1 - \Delta T_0) \qquad (3)$$

Note that the stationary air layer separated by transparent thin film is shown by the dotted-line block in FIG. 1. This air layer serves to reduce to a substantially negligible extent heat dispersion caused by convection heat transfer from the black surfaces $S_0$ and $S_1$.

It is clear from the three equations described above that when the temperature difference between the two black surfaces $S_0$ and $S_1$ is measured by arranging one or more pairs of temperature measuring bodies such as differential thermocouples connected in series on the two black surfaces $S_0$ and $S_1$ of the thermal resistant plates R, the quantity $Q(= Q_1 - Q_0)$ of radiant heat actually transmitted and received between these two surfaces A and B is proportional to the measured value of the aforementioned temperature difference.

Figure 2:
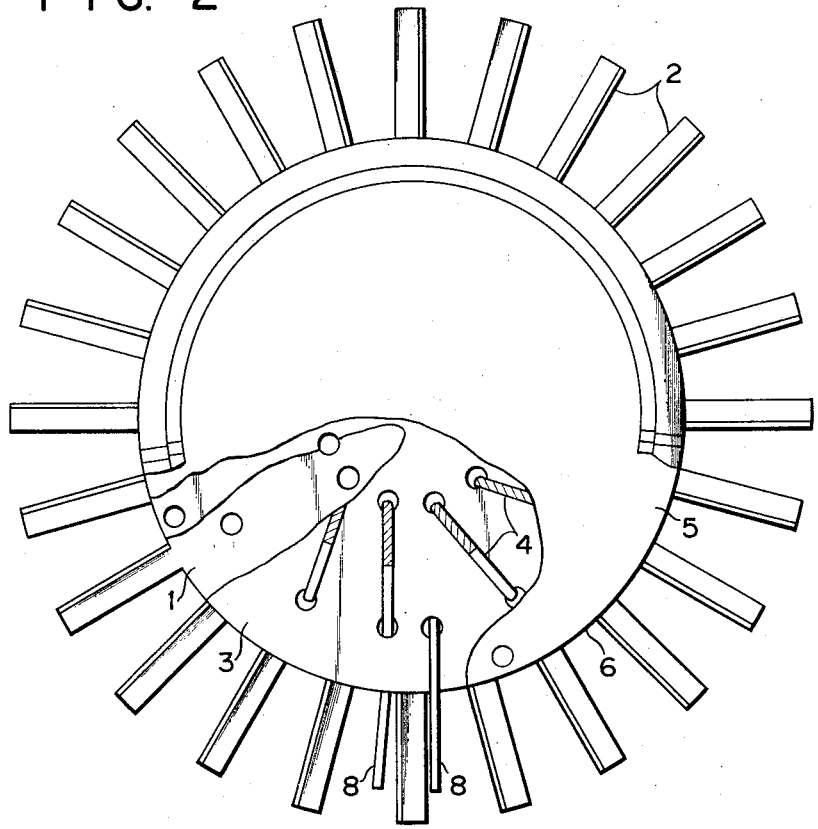
FIG. 2 is a front elevation partly in section, illustrating a radiant heat flow meter embodying the invention.
Figure 3:
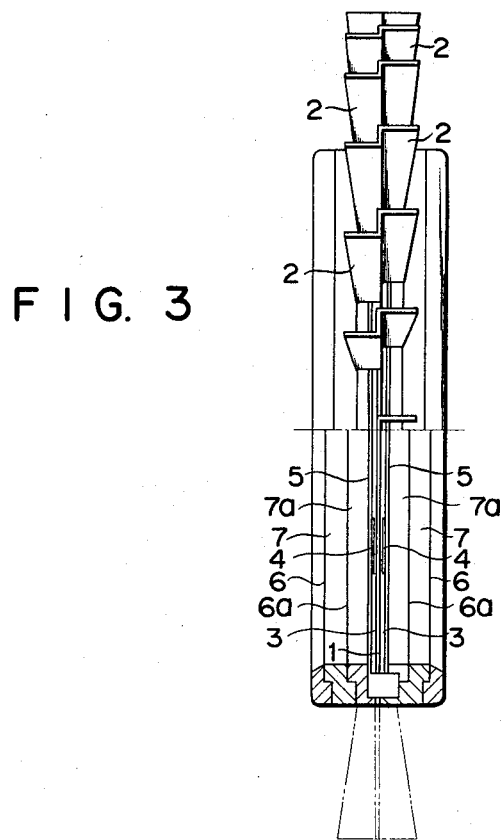
FIG. 3 is a side elevation of FIG. 2 partly in section.

With reference to the drawings, a radiant heat flow meter fabricated according to the basic principle of the invention will be described. In FIGS. 2 and 3, the numeral 1 designates a substrate of good thermal conductivity. A plurality of fins 2 are provided one the periphery of this substrate. Thermally resistant plates 3, 3 each with a black surface are disposed on two faces of the substrate 1. One or more pairs of filmy differential thermocouples 4 connected with each other are arranged on the surfaces of the thermally resistant plates 3, 3 so that the temperature difference between the surfaces of two thermally resistant plates disposed on two faces of the substrate 1 can be measured by these thermocouples. The thermocouple shown in FIG. 2 is made of constantan and copper (indicated by the five oblique lines in the figure) and is formed into a thin film by vacuum evaporation, although the known materials are now available. 5 denotes black thermally resistant plates disposed in contact with the thermocouples 4. For example, a thin plate coated with vacuum plated carbon film is well adapted for the black thermally resistant plate 5. These black plates are coated with transparent thin plates 6 and 6a, respectively, so as to form two stationary air layers 7 and 7a respectively on the outside of the black plates 5. For example, transparent thin quartz plates each about 10 microns thick are practical for use as the transparent thin plates 6 and 6a. These transparent thin plates 6 and 6a preferably are constructed so that, when stained, they can easily be replaced by new ones. Note that the stationary air layers 7 and 7a serve to prevent radiant heat from being emitted from the black thermally resistant plates. 8 designates a lead wire of the differential thermocouples connected to a microvoltmeter, as described below.

Figure 4:
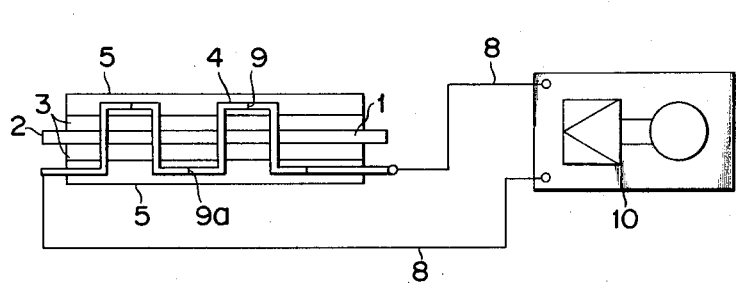
FIG. 4 is an explanatory diagram illustrating the circuit connection of the radiant heat flow meter shown in FIGS. 2 and 3.

FIG. 4 illustrates a connection diagram of the differential thermocouples. Joints 9 and 9a of the thermocouple 4 are disposed on the surfaces of the thermally resistant plates 3, 3, respectively, so that the temperature difference between the surfaces of these plates 3, 3 can be obtained from thermoelectromotive force which can be measured by the microvoltmeter 10. Note that throughout FIGS. 2, 3 and 4, similar reference numerals are used to designate similar units.

It should be noticed that not only the aforementioned thermocouple but also a resistance bridge or the like may be used to measure the temperature difference between the surfaces of the thermally resistant plates.

If necessary, a means for cooling the substrate 1 of high thermal conductivity may be employed to prevent over-heating of the measuring instrument itself. A radiation fin or a refrigerant or both may also be used as a cooling means.

Example

Measurements made by the radiant heat flow meter of the invention will now be described.

Figure 5:
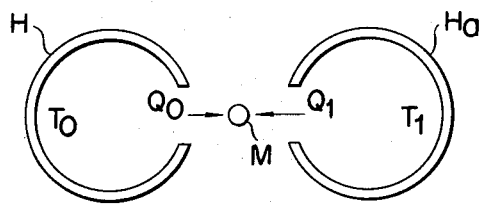
FIG. 5 is a view illustrating the arrangement of the radiation sources and the radiant heat flow meter in measuring radiant heat by means of a radiant heat flow meter of the invention.

Black cavity radiation sources H and Ha were disposed as shown in FIG. 5. The differential thermocouple type radiant heat flow meter M embodying the invention was interposed between these two radiation sources. In this meter, the substrate 1 is a silver plate having a thickness of 0.1 mm and a diameter of 40 mm; the thermally resistant plates 3, 3 are mica plates each having a thickness of 80 microns and a diameter of 40 mm; and the thermocouples are made of constantan and copper.

Figure 6:
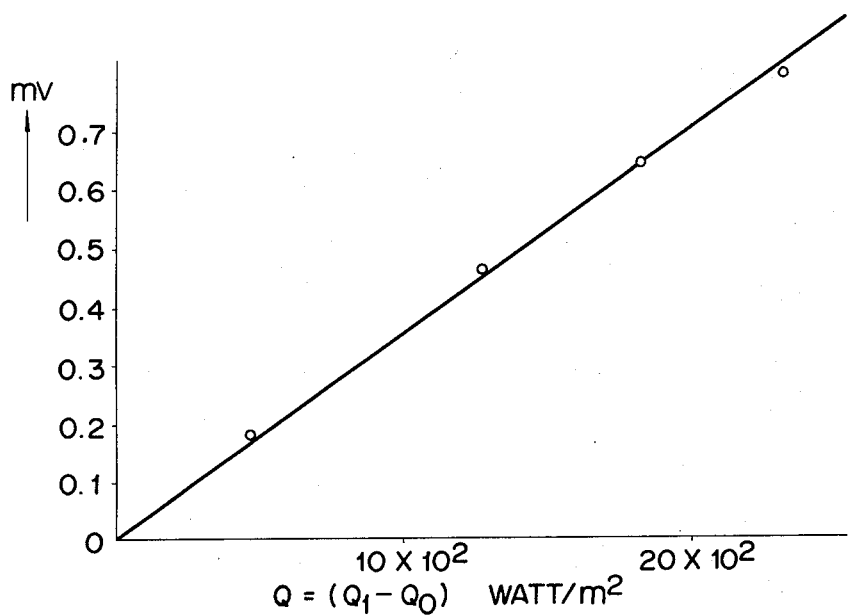
FIG. 6 is a diagram showing the results of radiant heat measurements made according to the arrangement of FIG. 5.

By varying the temperatures $T_0$ and $T_1$ of the radiation sources H and Ha respectively, measurements were made to investigate the relationship between $Q$ and $mV$ where $Q = Q_1 - Q_0$ (watt/m$^2$), i.e., the difference between the quantities $Q_1$ and $Q_0$ of radiant heat emitted from the two radiation sources Ha and H to the meter M and $mV$ denotes the thermoelectromotive force of the meter. This result is shown by the straight line in FIG. 6.

It has been found that this radiant heat flow meter is of good practical use, yielding an indicated value within the range of stable measurement by the commercial microvoltmeter now in use and reaching a constant value in less than 1 minute.

What is claimed is:

1. A radiant heat flow meter comprising:

a thin plate of good thermal conductivity;
   thermally resistant plates disposed on two faces of said thin plate;
   said thin plate extending beyond the edges of said thermolly resistant plates so as to be maintaind at a temperature substantially equal to the ambient temperature;
   at least one pair of mutually connected temperature measuring bodies disposed on the surfaces of said thermally resistant plates;
   black thermally resistant plates disposed in contact with said temperature measuring bodies; and
   transparent thin plates covering said black plates so as to form air layers on the outside of said black plate.

2. A radiant heat flow meter as claimed in claim 1 wherein said temperature measuring bodies are differential thermocouples.

3. A radiant heat flow meter as claimed in claim 1 wherein said temperature measuring bodies are differential thermometers.

* * * * *